United States Patent
Kovacs et al.

(10) Patent No.: US 7,571,999 B2
(45) Date of Patent: *Aug. 11, 2009

(54) OVERCOAT COMPOSITIONS, OIL-BASED INK COMPOSITIONS, AND PROCESSES FOR INK-JET RECORDING USING OVERCOAT AND OIL-BASED INK COMPOSITIONS

(75) Inventors: Gregory J. Kovacs, Webster, NY (US); Marcel P. Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 492 days.

This patent is subject to a terminal disclaimer.

(21) Appl. No.: 11/289,605

(22) Filed: Nov. 30, 2005

(65) Prior Publication Data

US 2007/0120923 A1    May 31, 2007

(51) Int. Cl.
  *G01D 11/00* (2006.01)
(52) U.S. Cl. .......................... 347/100; 347/95
(58) Field of Classification Search ................ 347/100, 347/95, 96, 101, 105; 106/31.6, 31.27, 31.13; 523/160
  See application file for complete search history.

(56) References Cited

U.S. PATENT DOCUMENTS

| | | | |
|---|---|---|---|
| 4,476,210 A | 10/1984 | Croucher et al. | |
| 5,989,325 A | 11/1999 | Sacripante et al. | |
| 6,412,935 B1 | 7/2002 | Doumaux | |
| 6,529,225 B1 | 3/2003 | Shiraiwa et al. | |
| 6,561,644 B2 | 5/2003 | Romano, Jr. et al. | |
| 6,630,153 B2 | 10/2003 | Long et al. | |
| 6,655,797 B2 | 12/2003 | Smith et al. | |
| 6,692,881 B2 | 2/2004 | Tsubuko et al. | |
| 6,854,823 B2 | 2/2005 | Rutland et al. | |
| 2003/0067527 A1 | 4/2003 | Temple | |
| 2003/0202026 A1 | 10/2003 | Smith et al. | |
| 2003/0202039 A1 | 10/2003 | Rutland et al. | |
| 2004/0006158 A1 | 1/2004 | Horie et al. | |
| 2004/0017409 A1 | 1/2004 | Mizutani et al. | |
| 2004/0056940 A1 | 3/2004 | Rutland et al. | |
| 2004/0068031 A1 | 4/2004 | Horie et al. | |
| 2004/0104987 A1 | 6/2004 | Smith et al. | |
| 2004/0197531 A1* | 10/2004 | Vincent et al. | ........... 428/195.1 |
| 2005/0078129 A1 | 4/2005 | Ahlvin et al. | |
| 2006/0001040 A1* | 1/2006 | Kim et al. | ................ 438/127 |

FOREIGN PATENT DOCUMENTS

| | | |
|---|---|---|
| EP | 0 134 727 A1 | 3/1985 |
| EP | 1 155 866 A2 | 11/2001 |
| EP | 1 393 924 A2 | 3/2004 |
| EP | 1 524 125 A1 | 4/2005 |
| JP | A 2002-144551 | 5/2002 |
| JP | A 2002-235029 | 8/2002 |
| JP | A 2003-35043 | 2/2003 |
| JP | A 2003-53942 | 2/2003 |
| JP | A 2003-292880 | 10/2003 |
| JP | A 2004-230759 | 8/2004 |
| JP | A 2004-262232 | 9/2004 |
| JP | A 2004-314350 | 11/2004 |
| JP | A 2005-007577 | 1/2005 |
| WO | WO 00/30856 A1 | 6/2000 |
| WO | WO 01/84247 A1 | 11/2001 |

* cited by examiner

*Primary Examiner*—Manish S Shah
(74) *Attorney, Agent, or Firm*—Oliff & Berridge, PLC

(57) ABSTRACT

Overcoat compositions include film-forming resins and organic liquids. Overcoat compositions are included in ink sets that also include oil-based ink compositions. Methods for ink-jet printing use oil-based ink compositions and overcoat compositions.

17 Claims, No Drawings

OVERCOAT COMPOSITIONS, OIL-BASED INK COMPOSITIONS, AND PROCESSES FOR INK-JET RECORDING USING OVERCOAT AND OIL-BASED INK COMPOSITIONS

BACKGROUND

The present disclosure relates in general to ink-jet recording. In particular, this disclosure relates to ink-jettable overprint compositions and their use in methods for protecting images on a substrate. The overprint compositions of the present disclosure provide a number of advantages to images formed from oil-based ink compositions, such as, for example, image permanence, gloss, thermal stability, light-fastness, smear resistance, and abrasion resistance.

Many liquid-ink compositions, and particularly those used in ink-jet recording, include a colorant, pigment or dye, and a liquid, which is typically an aqueous liquid vehicle, such as water, and/or a low vapor pressure solvent. The ink composition is deposited onto the substrate to form an image in the form of text and/or graphics. Once deposited, the liquid component is removed from the ink composition and the paper to fix the colorant to the substrate by either natural air-drying or by active drying.

Coated substrates and ink-jet recording media for use in ink-jet printers, in particular with non-aqueous pigmented ink compositions, are described, for example, in U.S. Patent Application Publication No. 2005/0078129, the disclosure of which is incorporated herein by reference in its entirety. This publication discloses methods of thermally sealing the overcoat of multilayer media. Ink-jet recording media using overcoat compositions with aqueous ink compositions are also known and are described in Japanese Patent Application Publications JP 2003 053942 A2 and JP 2002 144551 A2, the disclosures of which are incorporated herein by reference in their entirety. Japanese Patent Application Publication JP 2004 230759 A2 also discloses ink-jet recording media for non-aqueous pigmented ink compositions, in which a topcoat layer is composed mainly of inorganic ultra-fine particles with an average particle size of less than 1 micron, and the undercoat layer is composed mainly of an alkaline earth metal salt as a pigment and a binder.

Ink-jet recording media using undercoat compositions, for use with aqueous ink compositions, are described in Japanese Patent Application Publication JP 2004 262232 A2, the disclosure of which is totally incorporated herein by reference. Ink-jet recording media using overcoat compositions, for use with aqueous ink compositions, are described in Japanese Patent Application Publications JP 2003 053942 A2 and JP 2002 144551 A2, the disclosures of which are totally incorporated herein by reference.

U.S. Patent Application Publication No. 2004/0104987, the disclosure of which is incorporated herein by reference in its entirety, describes ink-jet printing systems that include the deposition of fixers and overcoats, in which drops of fixer material and of overcoat material are deposited on previously deposited colored ink drops. In addition, smudge-resistant ink-jet printing systems using overcoat and fixer solutions are also described in U.S. Patent Application Publications Nos. 2004/0056940, 2003/0202039 and 2003/0202026, and in U.S. Pat. Nos. 6,854,823; 6,655,797 and 6,412,935, the disclosures of which are incorporated herein by reference in their entirety. European Patent Application Publication EP 01155866 A2, the disclosure of which is incorporated herein by reference in its entirety, discloses methods of applying fixer fluid overcoats to porous or semi-porous ink-jet printed media.

Dye-stabilized liquid developers and methods for making such developers are described in U.S. Pat. No. 4,476,210, the disclosure of which is incorporated herein by reference in its entirety. This patent discloses liquid developers including marking particles, which include a thermoplastic resin core with an amphipathic block or graft copolymer steric stabilizer that is irreversibly chemically or physically anchored to the thermoplastic resin core and the dye being imbibed in the thermoplastic resin core, dispersed in aliphatic dispersion media. In these developers, the dye is soluble in the thermoplastic resin core and insoluble in the dispersion media.

Methods of ink-jet printing using UV curable undercoats are described, for example, in U.S. Patent Application Publication No. 2003/0067527 and in international patent application publication WO 0030856, the disclosures of which are incorporated herein by reference in their entirety. Ink-jet printers for use with UV curable ink compositions are described in Japanese Patent Application Publication JP 2005 007577 A2, the disclosure of which is incorporated herein by reference in its entirety. Compositions for photo-curable overcoat layers and printed matter are described in Japanese Patent Application Publication JP 2003 292880 A2, the disclosure of which is totally incorporated herein by reference.

Apparatus, methods and wax coatings for improved durability and visual appearance of printed images are described in international patent application publication WO 00184247 A2, the disclosure of which is incorporated herein by reference in its entirety.

Image-receiving layer and overcoat layer compositions, which are cured using an active energy beam, for ink-jet recording are described in European Patent Application Publication EP 01348727 A2, the disclosure of which is incorporated herein by reference in its entirety.

U.S. Patent Application Publication No. 2004/0017409, the disclosure of which is incorporated herein by reference in its entirety, discloses ink-jet recording process and ink-jet recording apparatus in which protective coatings are formed on images by an overcoat device that uses heat transfer sheets.

Japanese Patent Application Publication JP 2004 314350 A2, the disclosure of which is totally incorporated herein by reference, describes methods for ink-jet recording and recorded articles in which a clear ink composition comprising polymer particulates is discharged onto a printed layer, the clear ink composition forms a liquid layer that is then heated to form an overcoat layer.

Ink-jet printers including overcoating printheads, positioned downstream from the ink-jet printheads, that provide coatings that are later hardened over printed images are described in Japanese Patent Application Publication JP 2003 35043 A2, the disclosure of which is incorporated herein by reference in its entirety. Transparent protective overcoats for offset, ink-jet and xerographic images are described in Japanese Patent Application Publication JP 2002 235029 A2, the disclosure of which is incorporated herein by reference in its entirety.

Overcoat layers of water-dispersible, hydrophobic polyester resin are disclosed in U.S. Pat. No. 6,561,644, the disclosure of which is incorporated herein by reference in its entirety. Ink-jet processes for improving image durability and quality by overcoating ink-jet images with layers containing water-dispersible clay particles are described in European Patent Application Publication EP 01393924 A2, the disclosure of which is incorporated herein by reference in its entirety.

Printing methods and apparatus for forming protective layers on printed media by transferring protective agents while avoiding perforated portions of the media are disclosed in U.S. Pat. No. 6,529,225, the disclosure of which is incorporated herein by reference in its entirety.

European Patent Application Publication EP 01524125 A1, the disclosure of which is incorporated herein by reference in its entirety, discloses methods of thermally sealing overcoat layers of multilayer media, in which porous topcoats are heated to close the pores and provide protective layers between the inner ink-receiving layers and the environment.

While a number of compositions and processes, such as those described above, are known for overcoating images produced by ink-jet recording methods, particularly for aqueous ink compositions and photo-curable ink compositions, a need remains for curable overcoat compositions for oil-based ink compositions.

Oil-based liquid ink compositions include a colorant, pigment or dye, and an oil-based liquid. The ink composition is deposited on the substrate to form an image in the form of text and/or graphics. Such oil-based pigmented ink compositions can provide excellent image quality on specially coated papers, such as silica-coated papers. Silica coatings immobilize the colorant on contact, providing sharp images. For example, liquid ink-jet recording oil-based ink compositions, displaying satisfactory pigment dispersibility, are described in U.S. Pat. No. 6,630,153, the disclosure of which is incorporated herein by reference in its entirety.

Oil-based ink compositions for ink-jet printers and methods for their production have been described, for example, in U.S. Patent Application Publications Nos. 2004/0068031 and 2004/0006158, the disclosures of which are incorporated herein by reference in their entirety, and in U.S. Pat. Nos. 6,692,881 and 5,989,325; the disclosures of which are incorporated herein by reference in their entirety.

However, images produced on plain paper using oil-based ink compositions do not generally have good image quality. Oils in the ink compositions spread laterally and vertically through pores in plain, untreated papers, and pigments in the ink compositions spread with the oils. Lateral pigment spread results in images having ragged edges. Vertical pigment spread results in image show-through.

Images formed using oil-based ink compositions, whether printed onto treated or plain paper, can also be degraded by smear and abrasion. Images on plain paper can also have inferior image quality due to the degradation of the color gamut caused by excessive penetration of the ink composition into the paper, which can result in low-gloss, unsaturated colors. This shortfall can also be seen in images formed using oil-based ink compositions on some treated papers. Thus, there exists a need for improved image quality for oil-based ink images.

Attempts have been made to respond to this need. For example, UV curable ink-jet ink compositions have been used in an attempt to overcome the failure of some ink-jet-generated images to withstand heat and sunlight. Typically, such UV curable ink-jet ink compositions include polymerizable monomers, oligomers, or a mixture thereof along with a dye or pigment for color. However, these ink compositions often contain relatively large amounts of toxic solvent or water, as described in U.S. Pat. Nos. 4,978,969 and 5,623,001, respectively, or other toxic components, such as the varnish described in U.S. Pat. No. 5,270,368, or require specific, impractical conditions, such as, the varnish described in U.S. Pat. No. 4,303,924. The disclosures of these U.S. Patents are incorporated herein by reference in their entirety.

In addition, Japanese Patent Application Publication JP 2002-308935 A2 discloses actinic radiation-curable resin overprint compositions for wet-on-wet printing to form glossy printed articles. Similarly, Japanese Patent Application Publication JP 11-092705 A2 discloses an imaging method for a lithographic plate in which a non-aqueous dispersion of resin particles is applied by ink-jet recording over an oil-based ink composition. The disclosures of these Japanese Patent Application Publications are incorporated herein in their entirety.

Thus, there still remains a need for improved compositions and processes, particularly for oil-based pigmented ink compositions and overprint compositions for use with oil-based ink compositions, and methods for use in ink-jet recording to provide glossy, durable images.

SUMMARY

The compositions and processes of the present disclosure, wherein an ink-based image and/or substrate thereof are coated with an ink-jettable overprint composition, variously satisfy these and other needs.

Aspects disclosed herein provide oil-based overcoat compositions for use in ink-jet recording using oil-based ink compositions. In particular, overcoat compositions including film-forming materials and organic liquids are provided.

Separately provided are oil-based ink compositions including organic liquids, unsaturated organic compounds, pigments, and metal salts. The unsaturated organic compounds may be chosen, in embodiments, from unsaturated fatty materials and unsaturated fatty materials having terminal polar groups.

Separately, oil-based pre-treatment compositions for use in ink-jet recording using oil-based ink compositions are provided. In particular, pre-treatment compositions including organic liquids and cross-linking initiators are provided.

Separately, ink sets including overcoat compositions, including film-forming materials and organic liquids, and oil-based ink compositions, are provided.

Separately, ink sets including pre-treatment compositions, including organic liquids and cross-linking initiators; oil-based ink compositions, including organic liquids, unsaturated organic compounds, colorants, and optional metal salts; and oil-based overcoat compositions, including film-forming materials and organic liquids, are provided.

Ink-jet recording processes are separately provided, in which overcoat compositions that include film-forming materials and organic liquids are employed.

Ink-jet recording processes are separately provided, in which pre-treatment compositions that include organic liquids and cross-linking initiators; oil-based ink compositions, including organic liquids, unsaturated organic compounds, colorants, and optional metal salts; and oil-based overcoat compositions, including film-forming materials and organic liquids, are employed.

These and other features and advantages of various exemplary embodiments of materials, devices, systems and/or methods are described in or are apparent from, the following detailed description.

DETAILED DESCRIPTION OF EMBODIMENTS

This disclosure provides overprint compositions for coating images generated with oil-based pigmented ink compositions, in order to provide high quality images. Oil-based ink compositions containing unsaturated organic compounds, such as polar-functional group-terminated unsaturated fatty materials; colorants; and optionally catalytic drying agents, in an oil-based liquid vehicle may be provided by ink-jet recording methods onto a treated or untreated substrate to form an image. Overprint compositions that contain film-forming resins in an oil-based vehicle can be provided by ink-jet recording methods onto the substrate. The film-forming resins in the overprint compositions provide a clear varnish that can be dried or cured with the ink composition and/or with a reactive pre-treatment composition, to provide images having improved quality and durability.

Overcoat Compositions

Aspects described herein provide ink-jettable, oil-based overcoat compositions comprising film-forming materials, organic liquids and, optionally, metal salts.

Any suitable film-forming material or combination of film-forming materials may be included in the overprint compositions of embodiments. The film-forming materials may be present in the overprint composition of embodiments from about 2 to about 90 weight %, from about 15 to about 40 weight % or from about 20 to about 30 weight % of the overprint composition.

Any suitable film-forming materials may be used in accordance with embodiments. In particular embodiments, the film-forming materials may be selected from film-forming resins, such as unsaturated resins; film-forming monomers and/or oligomers; latex dispersions of film-forming materials; and unsaturated organic materials, and mixtures thereof.

In embodiments, the one or more film-forming materials may be chosen from unsaturated resins. Suitable unsaturated resins for use in embodiments include, but are not limited to polystyrene, poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), poly(styrene-butyl acrylate-2-carboxyethyl acrylate), poly(styrene-butadiene-2-carboxyethyl acrylate), poly(styrene-isoprene-2-carboxyethyl acrylate), poly(styrene-butyl methacrylate-2-carboxyethyl acrylate), poly(butyl methacrylate-butyl acrylate-2-carboxyethyl acrylate), poly(butyl methacrylate-2-carboxyethyl acrylate), poly(styrene-butyl acrylate-acrylonitrile-2carboxyethyl acrylate), poly(acrylonitrile-butyl acrylate-2-carboxyethyl acrylate), branched/partially cross-linked copolymers of these polymers, and the like.

Similarly, the one or more film-forming materials of embodiments may be chosen from monomers and/or oligomers that react to produce film-forming resins. Suitable monomers and/or oligomers for use in embodiments include, but are not limited to styrene; acrylates such as methacrylates, butylacrylates, β-carboxy ethyl acrylate (β-CEA), etc.; butadiene; isoprene; acrylic acid; methacrylic acid; itaconic acid; acrylonitrile; benzenes such as divinylbenzene, etc., and the like. One or more of such monomers and/or oligomers may be used in embodiments. Known chain transfer agents, for example dodecanethiol or carbon tetrabromide, can be utilized to control the molecular weight properties of the resulting polymer.

In embodiments, the film-forming materials may be provided, in whole or in part, in the form of latex dispersions. Such film-forming latex dispersions may be prepared by a batch or by a semi-continuous polymerization resulting in the submicron non-cross-linked resin particles suspended in a non-aqueous medium. Latex dispersions that may be used in embodiments include, but are not limited to, dispersions of one or more of the unsaturated resins set forth above, dispersions of one or more of the monomers and/or oligomers set forth above, and the like and mixtures thereof.

In embodiments, any suitable thermoplastic resin may be used as the latex particles. Typical resins that may be used in embodiments include materials which are capable of non-aqueous dispersion polymerization as hereinafter described, are insoluble in the dispersion medium, and include poly (methyl acrylate), poly(methyl methacrylate), poly(ethyl, methacrylate), poly(hydroxyethyl methacrylate), poly(2-ethoxyethyl methacrylate), poly(butoxy ethoxy ethyl methacrylate), poly(dimethyl amino ethyl methacrylate), poly (acrylic acid), poly(methacrylic acid), poly(acrylamide), poly(methacrylamide), poly(acrylonitrile), poly(vinyl chloride) and poly(ureido-ethyl vinyl ether). In particular embodiments, the thermoplastic resin is chosen from homopolymers of vinyl acetate, N-vinyl-2-pyrrolidone, ethyl acrylate monomers and/or copolymers of any of said monomers. The mechanical properties of the particle can be altered or varied by the selection of the polymer used for the core of the particle. For example, using poly(vinyl pyrrolidone) as the core polymer gives a hard particle which retains its spherical shape on drying. On the other hand, poly(ethyl acrylate) particles coalesce on drying to form a film. This enables either opaque or transparent developers to be prepared and allows control of the thermomechanical properties that are essential for both transfer and direct liquid development.

In embodiments, the film-forming materials may be provided, in whole or in part, as one or more unsaturated organic compounds. The unsaturated organic compounds of embodiments may be unsaturated fatty materials, such as those having one or more terminal polar functional groups. In embodiments, the unsaturated organic compounds may be linear or branched compounds. These compounds may contain one or more double bonds and/or one or more triple bonds. Embodiments may include multiple unsaturated compounds, which may be the same or different from each other, and may contain different numbers of double and/or triple bonds.

Any suitable unsaturated organic material may be used as film-forming materials of embodiments, including but not limited to unsaturated fatty materials, such as $C_6$-$C_{30}$ linear alkenes and/or $C_6$-$C_{30}$ branched alkenes, and, in particular, unsaturated fatty materials that include one or more terminal polar functional groups, such as unsaturated linear and branched $C_6$-$C_{30}$ alcohols, amines, acids and acid salts. Any polar functional group may be suitably selected for use as one or more of the terminal polar functional groups of unsaturated fatty materials that include one or more terminal polar functional groups in embodiments. In embodiments, terminal polar functional groups may be chosen from alcohol functional groups, amine functional groups, acid functional groups, acid salts and combinations thereof. That is, each of the unsaturated organic compounds may include one or more terminal polar functional groups, which may be the same or different, and each unsaturated organic compound may have the same or different terminal polar functional groups as any other unsaturated organic compound. Thus, the unsaturated organic compounds may be chosen from unsaturated fatty materials having one or more polar terminal group, such as unsaturated fatty alcohols, unsaturated fatty amines, unsaturated fatty acids, salts of unsaturated fatty acids and mixtures and combinations thereof. In particular embodiments, the unsaturated organic compounds may be one or more compounds chosen from linolenic alcohols, linolic alcohols, oleyl alcohols, linolenic amines, linolic amines, oleyl amines, linolenic acids, linolic acids, oleyl acids, linolenic acid salts, linolic acid salts, oleyl acid salts, and mixtures thereof. In specific embodiments, the unsaturated organic compounds may be one or more compounds chosen from linolenic alcohols, linolic alcohols, linolenic acids and linolic acids.

Embodiments of overcoat compositions may comprise one or more organic liquids. The organic liquids function as oil-based liquid vehicles for the ink compositions of embodiments. Suitable organic liquids for use in embodiments include $C_6$-$C_{30}$ linear alkanes, such as those available under the tradename NORPAR from Exxon Corporation; $C_6$-$C_{30}$ branched alkanes, such as those available under the tradename ISOPAR from Exxon Corporation; $C_6$-$C_{30}$ linear alkenes and/or $C_6$-$C_{30}$ branched alkenes, and mixtures thereof. Other suitable organic liquids include, for example, the SOLTROL® series available from the Phillips Petroleum Company, and the SHELLSOL® series available from the Shell Oil Company. In particular embodiments, the organic liquids may be colorless, odorless, nontoxic, and/or nonflammable, having flash points greater than 104° F. (40° C.); such organic liquids include aliphatic hydrocarbons. Aromatic liquids are not suitable for use in some embodiments, due to their toxicity. The organic liquids of embodiments may be chosen from high-purity isoparaffinic hydrocarbons having a boiling point in the range of from about 140 to 350° C. Specific examples of such suitable organic liquids include, but are not limited to, NORPAR® 12, 13, and 15, available from Exxon Corporation; ISOPAR® G, H, L, and M, available from Exxon Corporation; AMSCO 460 Solvent and AMSCO OMS, available from American Mineral Spirits Company; SOLTROL, available from Phillips Petroleum Company; PAGASOL, available from Mobil Oil Corporation; SHELLSOL, available from Shell Oil Company; and the like.

In embodiments, overcoat compositions may comprise from about 45 to about 99%, such as from about 85 to about 97% or from about 90 to about 95%, by weight of the overcoat composition, of organic liquids. In particular embodiments, the organic liquids may comprise from about 0 to about 100%, such as from about 25 to about 75% or from about 50 to about 65%, by weight of the organic liquids, of one or more branched alkanes and about 100 to about 0%, such as from about 70 to about 20% or from about 30 to about 50%, by weight of the organic liquids, of one or more linear alkanes. In some embodiments, a ratio of linear to branched alkanes may be in a range of about 20 to about 70% branched alkane to about 30 to about 80% linear alkanes. The non-aqueous overcoating solution of embodiments may include straight chain or branched aliphatic hydrocarbons, alicyclic hydrocarbons, aromatic hydrocarbons, petroleum naphthas and halogen-substituted derivatives thereof.

In embodiments, the organic liquids are chosen from those having low vapor pressure at room temperature, to reduce smell and to meet environmental regulations in specific market applications. Specific examples of such suitable organic liquids include, but are not limited to, NORPAR® 12, 13, and 15, available from Exxon Corporation; ISOPAR® G, H, L, and M, available from Exxon Corporation; AMSCO 460 Solvent and AMSCO OMS, available from American Mineral Spirits Company; SOLTROL, available from Phillips Petroleum Company; PAGASOL, available from Mobil Oil Corporation; SHELLSOL, available from Shell Oil Company; and the like. In specific embodiments, the organic liquids are liquid hydrocarbons. The hydrocarbon solvents of embodiments may be high-purity isoparaffmic hydrocarbons having a boiling point in the range of from about 125° C. to about 350° C.

Overcoat compositions of embodiments may also optionally comprise one or more drying agents. As the drying agent of embodiments, use may be made, for example, of metal salts, heavy metal salts and organic drying compounds. Any suitable metal salts may be used in embodiments. Suitable metal salts include metal salt driers of the type used to catalyze the drying rate of lithographic printing ink compositions. The metal salts may be present either in the form of unsaturated fatty acid salt pigment dispersants or as additional components added to embodiments of overprint compositions. In embodiments, the metal salt drying agents include metals such as cobalt, manganese, lead, zirconium, calcium, barium, strontium, zinc, and combinations and/or mixtures thereof. Specific embodiments may include metal salts such as manganese stearate.

In embodiments, the metal salt drying agents may be heavy metal salts of carboxylic acids, such as vanadium, iron, manganese naphthalates and octoates, and, in particular embodiments, cobalt naphthalates and octoates. In addition, organic drying compounds, such as dialkyl aryl amines, such as dimethyl anilines and diethyl anilines, which may be para-substituted with organic groups such as phenyl, methyl methoxy, hydroxyl or amino groups. Mixtures of two or more metal salt drying agents may be used in embodiments. The metal salt drying agents of embodiments may also act with cross-linking initiators to promote cross-linking reactions.

In particular embodiments, mixtures of metal salts that initiate drying differently and/or accelerate the drying process of other metal salts may be used. For example, manganese is a bottom- or through-drier, drying within the film while cobalt is a top drier, drying the surface of the film. Zirconium is a weak drier that acts as an accelerant for cobalt and manganese driers.

In embodiments, overprint compositions may comprise from about 0 to about 25%, such as from about 0.1 to about 15% or from about 1 to about 5%, by weight of the overprint composition, of metal salt drying agents. In particular embodiments, the overprint composition may comprise from about 0.1 to about 3%, by weight of the overprint composition, of metal salt drying agents.

Overprint compositions according to embodiments may also include optional additives. Any suitable additive used in ink-jettable compositions may be included. In embodiments, additives include one or more of surfactants, biocides, UV absorbers, antioxidants, materials for enhancing abrasion resistance, such as hydrophobic nanosilica particles; materials for enhancing smear resistance, such as metal oxide particles, and the like.

In some embodiments, silica nanoparticles are included as additives. In particular embodiments, the silica nanoparticles are chosen from silica colloidal dispersions, such as those available Nissan Chemicals America as ORGANOSILICASOL™ compounds, and, specifically from the ORGANOSILICASOL™ compounds sold as ORGANOSILICASOL™ MT-ST, ORGANOSILICASOL™ MA-ST-MS, ORGANOSILICASOL™ IPA-ST, ORGANOSILICASOL™ IPA-ST-MS, ORGANOSILICASOL™ IPA-ST-L, ORGANOSILICASOL™ IPA-ST-ZL, ORGANOSILICASOL™ T IPA-ST-UP, ORGANOSILICASOL™ EG-ST, ORGANOSILICASOL™ NPC-ST-30, ORGANOSILICA- SOL™ MEK-ST, ORGANOSILICASOL™ MIK-ST-MS, ORGANOSILICASOL™ MIBK-ST, ORGANOSILICASOL™ PMA-ST, and ORGANOSILICASOL™ DMAC-ST, whose low-boiling solvent components respectively correspond to the following compounds: methanol, isopropanol, ethylene glycol, ethylene glycol mono-n-propyl ether, methyl ethyl ketone, methyl isobutyl ketone, propylene glycol monomethyl ether acetate, or N,N-dimethyl acetamide. Such silica particles may be dispersed in the overcoat compositions of embodiments by a solvent exchange process.

The silica nanoparticles may be present in the overcoat compositions of embodiments in any desired or effective particle size. In particular embodiments, the particle size may be not more than about 300 nm, not more than about 100 nm, or not more than about 50 nm, although the particle sizes in other embodiments may be outside of these ranges.

The silica nanoparticles may be present in the overcoat compositions of embodiments in any desired or effective amount, such as in ranges of from about 1 to about 40% by weight of the overcoat composition, of from about 5 to about 35% by weight of the overcoat composition, or from about 10 to about 25% by weight of the overcoat composition, although the silica nanoparticles of embodiments may be present in amounts outside of these ranges.

In embodiments, the additives may include metal-oxide particles, such as particles prepared by physical vapor synthesis methods (PVS), including NANO TEK™ Aluminium Oxide, NANO TEK™ Antimony Tin Oxide and NANO TEK™ Zinc Oxide, which are available from Nanophase Technologies. These particles may be modified to enhance dispersibility in various vehicles, for example, the particles may be modified through a sol-gel process to form particles that can be easily dispersed in the liquid or solid overcoat compositions of embodiments.

Oil-Based Ink Compositions

Aspects described herein provide ink-jettable, oil-based ink compositions comprising organic liquids, unsaturated organic compounds, colorants, and optional additives.

Embodiments of ink compositions may comprise one or more organic liquids. The organic liquids function as oil-based liquid vehicles for the ink compositions of embodiments. Suitable organic liquids for use in embodiments include $C_6$-$C_{30}$ linear alkanes, such as those available under the tradename NORPAR from Exxon Corporation; $C_6$-$C_{30}$ branched alkanes, such as those available under the tradename ISOPAR from Exxon Corporation; $C_6$-$C_{30}$ linear alkenes and/or $C_6$-$C_{30}$ branched alkenes, and mixtures thereof. Other suitable organic liquids include, for example, the SOLTROL® series available from the Phillips Petroleum Company, and the SHELLSOL® series available from the Shell Oil Company. In particular embodiments, the organic liquids are selected from those that have a low vapor pressure at room temperature and that provide solutions having a viscosity suitable for an ink-jet device, such as from about 1.5 to about 30 centipoise, or from about 2.5 to about 15 centipoise. Specific examples of such suitable organic liquids include, but are not limited to, NORPAR® 12, 13, and 15, available from Exxon Corporation; ISOPAR® G, H, L, and M, available from Exxon Corporation; AMSCO 460 Solvent and AMSCO OMS, available from American Mineral Spirits Company; SOLTROL, available from Phillips Petroleum Company; PAGASOL, available from Mobil Oil Corporation; SHELLSOL, available from Shell Oil Company; and the like.

In embodiments, ink compositions may comprise from about 45 to about 99%, such as from about 85 to about 97% or from about 90 to about 95%, by weight of the ink composition, of organic liquids. In particular embodiments, the organic liquids may comprise from about 0 to about 100%, such as from about 25 to about 75% or from about 50 to about 65%, by weight of the organic liquids, of one or more branched alkanes and about 100 to about 0%, such as from about 70 to about 20% or from about 30 to about 50%, by weight of the organic liquids, of one or more linear alkanes. Linear and branched unsaturated organic liquids may be substituted, in whole or in part, for linear or branched alkanes, to improve image robustness.

Ink compositions of embodiments also comprise one or more unsaturated organic compounds. The unsaturated organic compounds of embodiments may be chosen from unsaturated fatty materials, such as unsaturated fatty materials that include one or more terminal polar functional groups. In embodiments, the unsaturated organic compounds may be linear or branched and may contain one or more double bonds and/or one or more triple bonds. Embodiments may include multiple unsaturated compounds, which may be the same or different from each other, and may contain different numbers of double and/or triple bonds.

Any suitable unsaturated organic material may be used in embodiments, including but not limited to unsaturated fatty materials, such as $C_6$-$C_{30}$ linear alkenes and/or $C_6$-$C_{30}$ branched alkenes, and, in particular, unsaturated fatty materials that include one or more terminal polar functional groups, such as unsaturated linear and branched $C_6$-$C_{30}$ alcohols, amines, acids and acid salts. Any polar functional group may be suitably selected for use as one or more of the terminal polar functional groups of unsaturated fatty materials that include one or more terminal polar functional groups in embodiments. In embodiments, terminal polar functional groups may be chosen from alcohol functional groups, amine functional groups, acid functional groups, acid salts and combinations thereof. That is, each of the unsaturated organic compounds may include one or more terminal polar functional groups, which may be the same or different, and each unsaturated organic compound may have the same or different terminal polar functional groups as any other unsaturated organic compound. Thus, the unsaturated organic compounds may be chosen from unsaturated fatty materials having one or more polar terminal group, such as unsaturated fatty alcohols, unsaturated fatty amines, unsaturated fatty acids, salts of unsaturated fatty acids and mixtures and combinations thereof. In particular embodiments, the unsaturated organic compounds may be one or more compounds chosen from linolenic alcohols, linolic alcohols, oleyl alcohols, linolenic amines, linolic amines, oleyl amines, linolenic acids, linolic acids, oleyl acids, linolenic acid salts, linolic acid salts, oleyl acid salts, and mixtures thereof.

In embodiments, oil-based ink compositions may comprise from about 10 to about 50%, such as from about 15 to about 45% or from about 20 to about 35%, by weight of the ink composition, of unsaturated organic compounds. In some embodiments, the oil-based ink compositions may comprise unsaturated organic compounds in amounts greater than about 25% by weight of the ink composition.

Ink compositions of embodiments also comprise one or more colorants. Colorants that may be included in ink compositions of embodiments include pigments, dyes, mixtures of pigments, mixtures of dyes, mixtures of pigments and dyes, and the like. In specific embodiments, the colorants are one or more of pigments and mixtures of pigments.

Any dye or pigment that is capable of being dispersed or substantially dissolved in the oil-based vehicle and is compatible with the other ink components may be included in embodiments. In particular embodiments, oil-based ink compositions may contain magenta colorants, cyan colorants, yellow colorants and/or black colorants, such as those described in U.S. Pat. No. 5,989,325, the disclosure of which is incorporated herein by reference in its entirety.

In some embodiments, the colorants are chosen from carbon black, and cyan, magenta and yellow pigments. Ink compositions including such colorants may demonstrate improved color stability in the presence of free radicals and/or improved light stability.

In particular embodiments, the colorants may be dyes, which may be chosen from solvent dyes. In specific embodiments, the dyes are chosen from spirit solvent dyes, which may be particularly compatible with the liquid vehicles of certain ink compositions and pre-treatment compositions. Examples of suitable spirit solvent dyes include those described, for example, in U.S. Pat. No. 5,989,325.

Examples of suitable pigments include Violet Toner VT-8015 (Paul Uhlich), PALIOGEN Violet 5100 (BASF), PALIOGEN Violet 5890 (BASF), Permanent Violet VT 2645 (Paul Uhlich), HELIOGEN Green L8730 (BASF), ARGYLE Green XP-111-S (Paul Uhlich), Brilliant Green Toner GR 0991 (Paul Uhlich), LITHOL Scarlet D3700 (BASF), TOLUIDINE Red (Aldrich), Scarlet for THERMOPLAST NSD PS PA (Ugine Kuhlmann of Canada), E.D. TOLUIDINE Red (Aldrich), LITHOL Rubine Toner (Paul Uhlich), LITHOL Scarlet 4440 (BASF), BON Red C (Dominion Color Company), Royal Brilliant Red RD-8192 (Paul Uhlich), ORACET Pink RF (Ciba-Geigy), PALIOGEN Red 3871K (BASF), PALIOGEN Red 3340 (BASF), LITHOL Fast Scarlet L4300 (BASF), HELIOGEN Blue L6900, L7020 (BASF), HELIOGEN Blue K6902, K6910 (BASF), HELIOGEN Blue D6840, D7080 (BASF), SUDAN Blue OS (BASF), NEOPEN Blue FF4012 (BASF), PV Fast Blue B2G01 (American Hoechst), IRGALITE Blue BCA (Ciba-Geigy), PALIOGEN Blue 6470 (BASF), SUDAN III (Red Orange), (Matheson, Colemen Bell), SUDAN II (Orange), (Matheson, Colemen Bell), SUDAN Orange G (Aldrich), SUDAN Orange 220 (BASF), PALIOGEN Orange 3040 (BASF), ORTHO Orange OR 2673 (Paul Uhlich), PALIOGEN Yellow 152,1560 (BASF), LITHOL Fast Yellow 0991 K (BASF), PALIOTOL Yellow 1840 (BASF), NOVOPERM Yellow FGL (Hoechst), Permanent Yellow YE 0305 (Paul Uhlich), LUMOGEN Yellow D0790 (BASF), SUCO Yellow L1250 (BASF), SUCO Yellow D1355 (BASF), SUCO Fast Yellow D1355, D1351 (BASF), HOSTAPERM Pink E (American Hoechst), FANAL Pink D4830 (BASF), CINQUASIA Magenta (Du Pont), PALIOGEN Black L0084 (BASF), Pigment Black K801 (BASF), and carbon blacks such as REGAL 330® (Cabot), Carbon Black 5250, Carbon Black 5750 (Columbia Chemical Company).

In embodiments, oil-based ink compositions may comprise from about 1 to about 25%, such as from about 2 to about 15% or from about 3 to about 10%, by weight of the ink composition, of colorants. In some embodiments, colorants may be present in the oil-based ink compositions in amounts greater than about 3%, such as greater than about 5%, by weight of the ink composition.

Oil-based ink compositions according to embodiments may also include optional additives. Any suitable additive used in ink-jettable compositions may be included. In embodiments, additives include one or more of drying agents, surfactants, biocides, UV absorbers, antioxidants, and the like.

In particular, oil-based ink compositions of embodiments may also optionally comprise one or more drying agents. As the drying agent of embodiments, use may be made, for example, of metal salts, heavy metal salts and organic drying compounds. Any suitable metal salts may be used in embodiments. Suitable metal salts include metal salt driers of the type used to catalyze the drying rate of lithographic printing ink compositions. The metal salts may be present either in the form of unsaturated fatty acid salt pigment dispersants or as additional components added to the oil-based ink compositions.

Any suitable metal salts may be used in the oil-based ink compositions of embodiments. Suitable metal salts include metal salt drying agents of the type used to catalyze the drying rate of lithographic printing ink compositions. Metal salts may be present either as unsaturated fatty acid salt pigment dispersants or as additional components added to the oil-based ink compositions of embodiments. In embodiments, the metal salt drying agents include metals such as cobalt, manganese, lead, zirconium, calcium, barium, strontium, zinc, and combinations and/or mixtures thereof. Specific embodiments may include metal salts such as manganese stearate.

In embodiments, the metal salt drying agents may be heavy metal salts of carboxylic acids, such as vanadium, iron, manganese naphthalates and octoates, and, in particular embodiments, cobalt naphthalates and octoates. In addition, organic drying compounds, such as dialkyl aryl amines, such as dimethyl anilines and diethyl anilines, which may be para-substituted with organic groups such as phenyl, methyl methoxy, hydroxyl or amino groups. Mixtures of two or more metal salt drying agents may be used in embodiments. The metal salt drying agents of embodiments may also act with cross-linking initiators of pre-treatment compositions to promote cross-linking reactions, such as those set forth below and those set forth in the co-pending U.S. Patent Application entitled, "Pre-Treatment Compositions, Oil-Based Ink Compositions, and Processes for Ink-Jet Recording Using the Pre-Treatment Compositions and the Oil-Based Ink Compositions, filed Aug. 31, 2005.

In particular embodiments, mixtures of metal salts that initiate drying differently and/or accelerate the drying process of other metal salts may be used. For example, manganese is a bottom- or through-drier, drying within the film while cobalt is a top drier, drying the surface of the film. Zirconium is a weak drier that acts as an accelerant for cobalt and manganese driers.

In embodiments, oil-based ink compositions may comprise from about 0 to about 25%, such as from about 2 to about 15% or from about 3 to about 5%, by weight of the ink composition, of metal salt drying agents. In some embodiments, metal salt drying agents may be present in the oil-based ink compositions in amounts less than about 5%, such as less than about 3%, by weight of the ink composition.

The oil-based ink composition of embodiments may optionally include solvents. Examples of solvents that may be suitable for use in embodiments of the oil-based ink composition include alcohols, such as alkyl alcohols and fluorinated alcohols; alkyl ketones; carboxylic acid esters; ethers and halogenated hydrocarbons.

Exemplary oils-based ink compositions, such as that illustrated below, may include branched and linear alkanes; unsaturated organic acid salts, such as cobalt salts of linolenic acid and cobalt salts of linolic acid; and pigments.

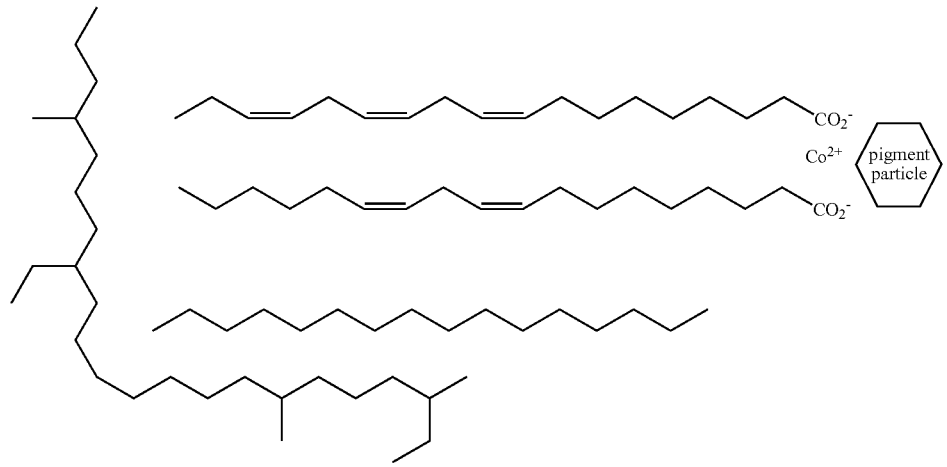

Other exemplary ink compositions, such as that illustrated below, may include branched and linear alkanes; unsaturated organic alcohols, such as linolenic alcohol and linolic alcohol; pigments and metal salts, such as manganese stearate.

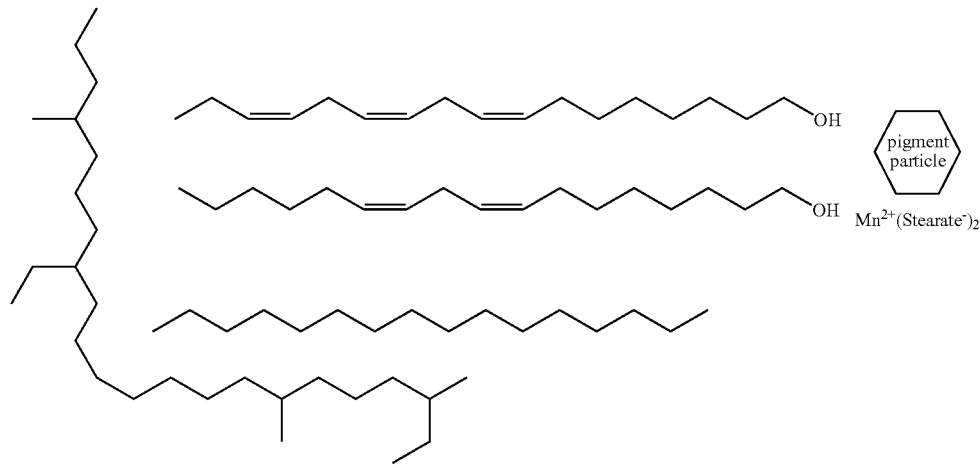

Pre-Treatment Compositions

Aspects described herein provide ink-jettable, oil-based pre-treatment compositions comprising organic liquids and cross-linking initiators, such as those set forth below and those set forth in the co-pending U.S. Patent Application entitled, "Pre-Treatment Compositions, Oil-Based Ink Compositions, and Processes for Ink-Jet Recording Using the Pre-Treatment Compositions and the Oil-Based Ink Compositions, filed Aug. 31, 2005.

Embodiments of pre-treatment compositions may comprise one or more organic liquids. The organic liquids function as oil-based liquid vehicles for the pre-treatment compositions of embodiments. Suitable organic liquids for use in embodiments include $C_6$-$C_{30}$ linear alkanes, such as those available under the trade name NORPAR from Exxon Corporation; $C_6$-$C_{30}$ branched alkanes, such as those available under the trade name ISOPAR from Exxon Corporation; $C_6$-$C_{30}$ linear alkenes and/or $C_6$-$C_{30}$ branched alkenes, and mixtures thereof. Other suitable organic liquids include, for example, the SOLTROL® series, available from the Phillips Petroleum Company, and the SHELLSOL® series, available from the Shell Oil Company can be selected. In embodiments, the organic liquids are chosen from solvents having a low vapor pressure at room temperature, in order to reduce smell and to meet environmental regulations in specific market applications. Specific examples of such suitable organic liquids include, but are not limited to, NORPAR® 12, 13, and 15, available from Exxon Corporation; ISOPAR® G, H, L, and M, available from Exxon Corporation; AMSCO 460 Solvent and AMSCO OMS, available from American Mineral Spirits Company; SOLTROL, available from Phillips Petroleum Company; PAGASOL, available from Mobil Oil Corporation; SHELLSOL, available from Shell Oil Company; and the like. In particular embodiments, the solvents are chosen from hydrocarbon solvents that are high-purity iso-paraffinic hydrocarbons having a boiling point in the range of from about 125° C. to about 350° C.

In addition, pre-treatment compositions of embodiments comprise one or more cross-linking initiators. These cross-linking initiators, once activated, initiate cross-linking of unsaturated materials, and thus provide a network in which colorants from ink compositions are immobilized. Suitable cross-linking initiators for use in embodiments have high solubility in non aqueous media, such as the above-mentioned organic liquids and in organic liquids of oil-based ink compositions; are stable at room temperature; and have high activation temperatures. In addition, suitable cross-linking initiators may, in embodiments, be readily activated under metal salt catalysis at ambient temperatures. In embodiments, the cross-linking initiators may be soluble in and/or compatible with oil-based ink compositions, such as those described below.

Any cross-linking initiator suitable for use in cross-linking unsaturated organic compounds may be used in accordance with embodiments. For example, embodiments of pre-treatment compositions may include one or more cross-linking initiator, such as thermally-activated initiators including peroxy compounds, hydroperoxy compounds and related initiators; azo compounds; photo-initiators including benzophenone, benzoin ethyl ether, and 2,2-dimethoxy-2-phenyl acetophenone; and the like; and mixtures thereof.

As the cross-linking initiator of embodiments, any suitable peroxy compound may be used. In particular embodiments, suitable peroxy compounds include but are not limited to, for example, hydrogen peroxide; diacylperoxides, such as decanoyl peroxide, diacetyl peroxide, dibenzoyl peroxide, di-p-chlorobenzoyl peroxide, dilauroyl peroxide; peroxyesters, such as tert-butylperoxy-2-ethylhexanoate and tert-butylperoxy benzoate, tert-butyl peroxyacetate, dicyclohexyl peroxy dicarbonate; hydroperoxides, such as tert-butyl hydroperoxide, cyclohexanone hydroperoxide, tert-amyl hydroperoxide, methylethyl ketone hydroperoxide and cumene hydroperoxide; perketals, such as tert-butyl peroxyneodecanoate, 2,5-dimethyl-2,5-di(2-ethylhexanoyl peroxy) hexane, 1,1-di(tert-butylperoxy)-3,3,5-trimethylcyclohexane and 1,1-di(tert-butylperoxy)-cyclohexane; alkyl peroxides, such as dicumyl peroxide, bis-(tert-butyl peroxybutane) and tert-butylcumyl peroxide; ketone peroxides, such as methyl ethyl ketone peroxide, methyl isobutyl ketone peroxide, acetyl acetone peroxide, 2,4-pentanedione peroxide, azoisobutyrodinitrile and cyclohexanone peroxide; and the like; and mixtures thereof.

As the cross-linking initiator of embodiments, any suitable azo compound likewise may be used. In particular embodiments, suitable azo compounds include but are not limited to, for example, as 2,2'-azobis(4-methoxy-2,4-dimethyl valeronitrile); 2,2'-azobis(2-isobutyronitrile); 2,2'dimethyl 2,2'-azobis(2-methlypropionate); 1,1'-azobis(cyclohexane-1-carbonitrile); 1-((cyano-1-methylethyl)azo) formamide; 2,2'-azobis(N-cyclohexyl-2-methylpropionamide); 2,2'-azobis(2,4-dimethyl valeronitrile); 2,2'-azobis(2-methylbutyronitrile); 2,2'-azobis(N-butyl-2-methlylpropionamide); polydimethylsiloxane initiators, such as the VPS-0501 and VPS-1001 available from Wako Pure Chemicals Industry; and polyethylene glycol based initiators, such as the VPE-021, VPE-041, and VPE-061 also available from Wako. In embodiments, the cross-linking initiator is chosen from azo initiators including, for example, 2,2'-azobis(2,4-dimethyl valeronitrile), 2,2'-azobis(2-methylbutyronitrile), 2,2'-azobis (N-butyl-2-methylpropionamide) and 2,2'-azobis(2-isobutyronitrile), and the like, and mixtures thereof.

In some embodiments, the cross-linking initiator may be a blend of initiators that may optionally contain a reactive thermally-activated initiator, such as 2'-azobis[N-(2-propenyl)-2-methylpropionamide], VF-096, Wako Pure Chemicals Industry Ltd., Chuo-Ku, Japan or Wako Chemicals Inc. Richmond, Va.

In embodiments, pre-treatment compositions may comprise from about 75 to about 99%, such as from about 85 to about 97% or from about 90 to about 95%, by weight of the pre-treatment composition, of organic liquids, and from about 0.01 to about 20%, such as from about 3 to about 15% or from about 5 to about 10%, by weight of the pre-treatment composition, of cross-linking initiators. In particular embodiments, the organic liquids may comprise from about 0 to about 100%, such as from about 25 to about 75% or from about 50 to about 65%, by weight of the organic liquids, of one or more branched alkanes and about 100 to about 0%, such as from about 70 to about 20% or from about 30 to about 50%, by weight of the organic liquids, of one or more linear alkanes. In embodiments in which the cross-linking initiator includes an azo initiator in combination with a peroxy initiator, the azo initiator may be present in amounts from about 0.1 to about 50% by weight of the total amount of cross-linking initiator, and in some embodiments from about 1 to about 10% by weight.

Thus, an exemplary pre-treatment composition, shown below, might include a branched alkane, such as 15-ethyl-3,7,19-trimethyl-docosane; a linear alkane, such as n-hexadecane (available as NORPAR from Exxon Corporation); and a cross-linking initiator, such as tert-butyl hydroperoxide (available as LUPEROX TBH90 from Atofina Canada, Oakville, Ontario, Canada).

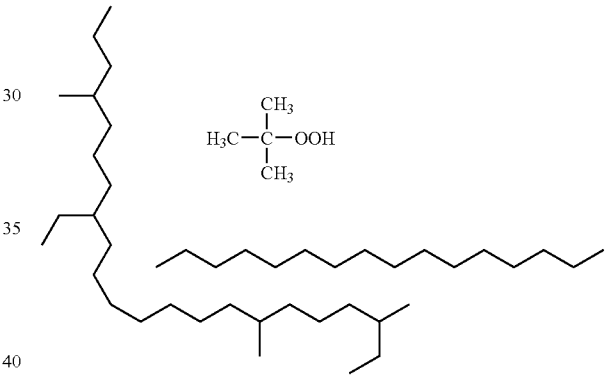

Although described above as containing an organic liquid and a cross-linking initiator, the pre-treatment can consist of these two components, or can comprise these two components in addition to other conventional additives. For example, if desired, the pre-treatment composition may include colorants, solvents, and the like. Optionally, the pre-treatment composition may also contain up to 40% by weight of self-dispersible nanoparticles, such as organic dispersible silica particles available from Nissan Chemicals Industry Limited.

Ink Sets

Ink sets of embodiments include one or more oil-based ink compositions and one or more overprint compositions. In particular embodiments, the ink sets include one or more oil-based ink compositions as described above and/or one or more overprint compositions as described above.

In particular embodiments, the ink sets comprise one or more oil-based ink compositions and one or more overcoat compositions. In particular embodiments, the ink sets comprise one or more overcoat compositions, one or more oil-based ink compositions including one or more magenta colorants, one or more oil-based ink compositions including one or more cyan colorants, one or more oil-based ink compositions including one or more yellow colorants and one or more oil-based ink compositions including one or more black colorants. In such embodiments, each of the overcoat compositions and each of the oil-based ink compositions are separately provided to separate ink jets.

Ink sets of embodiments include one or more pre-treatment compositions, one or more oil-based ink compositions and one or more overcoat composition. In particular embodiments, the ink sets include one or more pre-treatment compositions as described above and/or one or more oil-based ink compositions as described above and/or one or more overcoat compositions as described above. That is, in some embodiments, the pre-treatment composition, the ink compositions and the overcoat compositions described above can be used in combination in an ink set. In these embodiments, the components of the pre-treatment compositions, the ink compositions and the overcoat compositions can be suitably selected to interact with each other, to promote faster drying, decreased lateral and/or vertical movement of the colorant in the ink composition after it is deposited on the print substrate, and improved gloss and durability. However, it will be appreciated that the above-described pre-treatment compositions, ink compositions and overcoat compositions can be separately used with other conventional components, such as a combination of the above overcoat composition and a conventional pre-treatment composition and/or conventional ink composition.

In particular embodiments, the ink sets comprise one or more pre-treatment compositions, one or more oil-based ink compositions including one or more magenta colorants, one or more oil-based ink compositions including one or more cyan colorants, one or more oil-based ink compositions including one or more yellow colorants and/or one or more oil-based ink compositions including one or more black colorants, and one or more overcoat compositions. In such embodiments, the pre-treatment composition, each oil-based ink composition and the overcoat composition may be individually and separately provided to separate ink jets. For example, the pre-treatment composition may be supplied to a first ink jet, the magenta, cyan, yellow and black ink compositions may be separately supplied to a second through a fifth ink jet, respectively, and the overcoat composition may be supplied to a sixth ink jet. Separation of pre-treatment compositions, oil-based ink compositions and overcoat compositions permits premature cross-linking of unsaturated organic compounds to be avoided.

While any combination of exemplary embodiments of pre-treatment compositions, exemplary embodiments of ink compositions and exemplary embodiments of overcoat compositions may be used together, in particular ink set embodiments, the vehicle used in the pre-treatment composition, the ink compositions and the overcoat compositions may be the same.

According to embodiments, any suitable ink-jet printer can be used, in combination with overcoat compositions, oil-based ink compositions, pre-treatment compositions and/or ink sets described herein. Suitable printers are disclosed, for example, in the above-referenced U.S. Pat. Nos. 5,738,716; 5,788,754; 5,805,190; 5,858,075; 5,864,350; 5,917,509; 5,931,995 and 5,989,325, the disclosures of which are incorporated herein by reference in their entirety.

Ink-Jet Recording

Ink-jet recording in accordance with embodiments comprises depositing one or more ink compositions on a substrate, and thereafter depositing one or more overcoat compositions onto the printed substrate. This sequence allows cross-linking of the film-forming materials to provide a glossy, robust layer over the ink image. The tough film allows improved resistance to smear and abrasion; in embodiments in which hydrophobic nanosilica particles are included in the overprint compositions, abrasion resistance may be still further improved. Improved glossiness properties also permit improved color gamut for images produced using the overprint compositions of embodiments. In addition, cross-linking of the film-forming resins may also immobilize pigment particles, preventing pigment spreading. Thus, the overprint compositions provide high quality images.

Substrates that may be used for embodiments of ink-jet recording processes include plain and treated papers, fabrics, and other porous substances.

According to embodiments, any suitable ink-jet printer can be used, in combination with the overcoat compositions, ink compositions and/or ink sets described herein. Suitable printers are disclosed, for example, in the above-referenced U.S. Pat. Nos. 5,738,716; 5,788,754; 5,805,190; 5,858,075; 5,864,350; 5,917,509; 5,931,995 and 5,989,325, the disclosures of which are incorporated herein by reference in their entirety. The overcoat compositions may be delivered or deposited by jets that are separate from those used to deliver or deposit ink compositions.

Ink-jet recording in accordance with some embodiments comprises depositing one or more pre-treatment compositions onto a substrate, depositing one or more oil-based ink compositions onto the pre-treated substrate and then depositing one or more overcoat compositions onto the printed substrate.

In embodiments, one or more pre-treatment compositions are delivered to the substrates prior to the delivery of one or more oil-based ink compositions. This pre-treatment allows cross-linking of unsaturated organic compounds to begin immediately on ink delivery. Cross-linking immobilizes pigment particles, preventing pigment spreading. This allows high quality images to be obtained, with little or no edge spreading and/or with little or no image show through.

In embodiments, the pre-treatment compositions are deposited on the substrate prior to image formation. The pre-treatment compositions may be deposited over an entire substrate surface, such as to coat one side of a paper substrate in its entirety, or the pre-treatment compositions may be deposited in an image-wise fashion, such as to only those areas to which oil-based ink compositions will be subsequently applied. When applied in an image-wise manner, the pre-treatment composition can be applied such that it corresponds substantially to the subsequently applied ink image, or the pre-treatment can be applied to form a larger or smaller area than the subsequently applied ink image.

In embodiments, the overcoat compositions are deposited on the printed substrate. The overcoat compositions of embodiments may be deposited over an entire printed substrate surface, such as to coat one side of a printed paper substrate in its entirety, or the overcoat compositions may be deposited in an image-wise fashion, such as to only those areas to which oil-based ink compositions has been applied. When applied in an image-wise manner, the overprint composition can be applied such that it corresponds substantially to the applied ink image, or the overprint composition can be applied to form a larger or smaller area than the applied ink image.

EXAMPLES

Example 1

Latex Preparation

A poly(vinyl acetate) latex stabilized with poly(isobutylene-g-vinyl acetate) amphipathic copolymer is obtained as follows:

Polyisobutylene, 30 grams, is dissolved in 500 ml of n-hexadecane (47.0% by weight; available from Exxon Mobil Corporation and Sigma Aldrich). The solution is heated to 75° C. and purged with nitrogen for 30 minutes. To this solution, 5 ml of vinyl acetate and 0.75 grams of benzoyl peroxide are added. Polymerization is allowed to proceed for about 16 hours under constant stirring at 75° C. to obtain the amphipathic copolymer poly(isobutylene-g-vinyl acetate).

The prepared 500 ml solution of poly(isobutylene-g-vinyl acetate) is heated to 80° C. while being purged with nitrogen for 30 minutes. To this solution, 1.5 grams of benzoyl peroxide is added, followed by 110 ml of vinyl acetate. After about 30 minutes at 80° C., the solution becomes opalescent. The reaction is allowed to proceed for another 16 hours under constant stirring at about 60° C., after which a latex is obtained. The latex particles have a particle size of from about 0.2 to about 0.6 microns in diameter, as determined by electron microscopy. The solid content of the latex is adjusted to 4% weight/volume by the addition of 2.0 liters of n-hexadecane. Accordingly, a solution of about 20% weight of latex is obtained.

Example 2

Latex Preparation

A poly(vinyl acetate) latex stabilized with poly(isobutylene-g-vinyl acetate) amphipathic copolymer is obtained as follows:

Polyisobutylene, 30 grams, is dissolved in 500 ml of a vehicle that is 61.1% by vehicle weight of NORPAR 15 and 38.9% by vehicle weight of ISOPAR V (both available from Exxon Mobil Corporation). The solution is heated to 75° C. and purged with nitrogen for 30 minutes. To this solution, 5 ml of vinyl acetate and 0.75 grams of benzoyl peroxide are added. Polymerization is allowed to proceed for about 16 hours under constant stirring at 75° C. to obtain the amphipathic copolymer poly(isobutylene-g-vinyl acetate).

The prepared 500 ml solution of poly(isobutylene-g-vinyl acetate) is heated to 80° C. while being purged with nitrogen for 30 minutes. To this solution, 1.5 grams of benzoyl peroxide is added, followed by 110 ml of vinyl acetate. After about 30 minutes at 80° C., the solution becomes opalescent. The reaction is allowed to proceed for another 16 hours under constant stirring at about 60° C., after which a latex is obtained. The latex particles have a particle size of from about 0.2 to about 0.6 microns in diameter, as determined by electron microscopy. The solid content of the latex is adjusted to 4% weight/volume by the addition of 2.0 liters of a vehicle that is 61.1% by vehicle weight of NORPAR 15 and 38.9% by vehicle weight of ISOPAR V.

Example 3

Latex Preparation

A poly(vinyl acetate) latex stabilized with poly(isobutylene-g-vinyl acetate) amphipathic copolymer is obtained as follows:

Polyisobutylene, 30 grams, is dissolved in 500 ml of a vehicle that is 36.9% by vehicle weight of NORPAR 15 and 63.1% by vehicle weight of ISOPAR V (both available from Exxon Mobil Corporation). The solution is heated to 75° C. and purged with nitrogen for 30 minutes. To this solution, 5 ml of vinyl acetate and 0.75 grams of benzoyl peroxide are added. Polymerization is allowed to proceed for about 16 hours under constant stirring at 75° C. to obtain the amphipathic copolymer poly(isobutylene-g-vinyl acetate).

The prepared 500 ml solution of poly(isobutylene-g-vinyl acetate) is heated to 80° C. while being purged with nitrogen for 30 minutes. To this solution, 1.5 grams of benzoyl peroxide is added, followed by 110 ml of vinyl acetate. After about 30 minutes at 80° C., the solution becomes opalescent. The reaction is allowed to proceed for another 16 hours under constant stirring at about 60° C., after which a latex is obtained. The latex particles have a particle size of from about 0.2 to about 0.6 microns in diameter, as determined by electron microscopy. The solid content of the latex is adjusted to 4% weight/volume by the addition of 2.0 liters of a vehicle that is 36.9% by vehicle weight of NORPAR 15 and 63.1% by vehicle weight of ISOPAR V.

Example 4

Latex Preparation

A poly(vinyl acetate) latex stabilized with poly(isobutylene-g-vinyl acetate) amphipathic copolymer is obtained as follows:

Polyisobutylene, 30 grams, is dissolved in 500 ml of a vehicle that was 43.0% by vehicle weight of n-hexadecane (available from Exxon Mobil Corporation and Sigma Aldrich) and 57.0% by vehicle weight of SHELLSOL T (available Shell Chemicals). The solution is heated to 75° C. and purged with nitrogen for 30 minutes. To this solution, 5 ml of vinyl acetate and 0.75 grams of benzoyl peroxide are added. Polymerization is allowed to proceed for about 16 hours under constant stirring at 75° C. to obtain the amphipathic copolymer poly(isobutylene-g-vinyl acetate).

The prepared 500 ml solution of poly(isobutylene-g-vinyl acetate) is heated to 80° C. while being purged with nitrogen for 30 minutes. To this solution, 1.5 grams of benzoyl peroxide are added, followed by 110 ml of vinyl acetate. After about 30 minutes at 80° C., the solution becomes opalescent. The reaction is allowed to proceed for another 16 hours under constant stirring at about 60° C., after which a latex is obtained. The latex particles have a particle size of from about 0.2 to about 0.6 microns in diameter, as determined by electron microscopy. The solid content of the latex is adjusted to 4% weight/volume by the addition of 2.0 liters of a vehicle that is 43.0% by vehicle weight of n-hexadecane and 57.0% by vehicle weight of SHELLSOL T.

Example 5

Cobalt Salt of Linolenic Acid

The cobalt salt of linolenic acid may be obtained by direct electrochemical synthesis, as described by Kumar, N. et al., Canadian Journal of Chemistry (1987), 65(4), 740-3. In particular, 0.1 g of linolenic acid is dissolved in 50 mL acetone containing 0.04 g of $Et_2NClO_4$. This solution is added to prepare simple electrochemical cells of the form

and an initial voltage of 25 V is applied for 45 minutes. The cobalt (II) linolenic acid salt precipitates directly during electrochemical oxidation.

Alternatively, the cobalt salt of linolenic acid may be prepared by a precipitation process including adding the water-soluble cobalt sulphate to a hot sodium salt solution of the linolenic acid with agitation until precipitation is complete. The resulting salt is washed and dried by conventional methods. Cobalt salts of linolic acids may be similarly obtained by these methods.

Examples 6-9

Overcoat Composition

Exemplary overcoat compositions, Examples 6-9, are prepared by first adding the selected metal salt to the respective latex solutions, with mixing under nitrogen. The latex blends are mixed for a period of about 30 minutes, and unsaturated fatty acids, linolic and linolenic acids (available from Cayman Chemical), optionally in a peroxide-free grade, are then added to the latex blend. The resulting overcoat solution is mixed for about one hour at room temperature. Table 1 sets forth the specific compositions of Examples 6-9.

Examples 10-16

Pre-Treatment Compositions

Exemplary ink-jettable pre-treatment compositions, Examples 10-16 are prepared by adding tert-butyl hydroperoxide (LUPEROX TBH90, available from Arkema) and/or azo initiators to a vehicle. Table 2 sets forth the specific compositions of Examples 10-16.

Example 17

Carbon Black Pigment Concentrate

A stable carbon black concentrate in dibutyl sebacate, available from Morflex Inc. NC, is obtained as follows:

In a 1 liter, stainless steel beaker attached to a DISPERMAT FT (available from VMA-Getzmann GMBH) equipped with a 40 mm high-shear mixing dissolver set between an initial speed of 1500 and a final speed of 2500 rpm, 133.33 g of REGAL 660 carbon black (available from Cabot) is added slowly with high-shear mixing to a solution of 100 g of SOLSPERSE 13940 (40% active, available from Avecia), in 100.18 g of dibutyl sebacate (available from Morflex Inc.). The dispersion is continuously stirred under these conditions for a period of 2 hours after the addition of the carbon black. The loading of dispersant to carbon black is estimated at about 2.6 $mg/m^2$, providing optimum conditions for stability.

This dispersion is further processed for 270 minutes in a DISPERMAT SL-C 12 (available from VMA-Getzmann GMBH), under the following conditions: speed=2000 rpm; temperature=30-55° C. (water cooled); circulation rate=~3 g/s through a 125 ml chamber; amount of milling beads=100 ml; type of beads=0.8-1.0 zironium-silicon dioxide. The maximum particle size of the resulting carbon black dispersion is found to be less than 200 nm, with a mean particle size of about 80 nm, under the above experimental conditions and as measured with a MICROTRAC UPA 150.

Example 18-21

Carbon Black Ink Compositions

Exemplary ink compositions, Examples 18-21 are prepared by first dispersing the carbon concentrate of Example 17 into a vehicle, adding manganese stearate (available from Pechiney World Trade Inc.), and adding unsaturated fatty acids, linolic and linolenic acids (available from Cayman Chemical), optionally in a peroxide-free grade. Table 3 sets forth specific compositions of Examples 18-21.

TABLE 1

| | Vehicle | | | | | | | | | | |
| | Linear Alkane | | Branched Alkane | | Unsaturated Fatty Acid | | | | Metal Salt | | Latex (solid) | |
| Example | Type | Wt % | Type | Wt % | Type | Wt % | Type | Wt % | Type | Wt % | Type | Wt % |
| --- | --- | --- | --- | --- | --- | --- | --- | --- | --- | --- | --- | --- |
| 6 | n-hexadecane (Aldrich) | 19.76 | ISOPAR V (EXXON) | 22.24 | Linolenic Acid | 20 | Linolic Acid | 24.5 | ADDITOL VXW 6206 (Solutia Inc.) | 3 | Example 1 | 10.5 |
| 7 | NORPAR 15 (EXXON) | 26.89 | ISOPAR V (EXXON) | 17.11 | Linolenic Acid | 20 | Linolic Acid | 22 | ADDITOL VXW 6207 (Solutia Inc.) | 3 | Example 2 | 11 |
| 8 | NORPAR 15 (EXXON) | 8.55 | ISOPAR L (EXXON) | 14.65 | Linolenic Acid | 20 | Linolic Acid | 49 | Cobalt salt of linolic acid (Example 5) | 2 | Example 3 | 5.8 |
| 9 | n-hexadecane (Aldrich) | 13.04 | SHELLSOL T (Shell) | 17.28 | Linolenic Acid | 20 | Linolic Acid | 40.1 | Cobalt salt of linolic acid (Example 5) | 2 | Example 4 | 7.58 |

TABLE 2

| | Vehicle | | | | Cross-Linking Initiator | | | |
|---|---|---|---|---|---|---|---|---|
| | Linear Alkane | | Branched Alkane | | | | | |
| Example | Type | Wt % | Type | Wt % | Peroxy Type | Wt % | Azo Type | Wt % |
| 10 | n-hexadecane (Aldrich) | 40 | ISOPAR V (EXXON) | 45 | Tert-butyl hydroperoxide (LUPEROX TBH90) | 15 | | N/A |
| 11 | NORPAR 15 (EXXON) | 55 | ISOPAR V (EXXON) | 35 | Tert-butyl hydroperoxide (LUPEROX TBH90) | 10 | | N/A |
| 12 | NORPAR 15 (EXXON) | 35 | ISOPAR L (EXXON) | 60 | Tert-butyl hydroperoxide (LUPEROX TBH90) | 5 | | N/A |
| 13 | n-hexadecane (Aldrich) | 40 | SHELLSOL T (Shell) | 53 | Tert-butyl hydroperoxide (LUPEROX TBH90) | 7 | | N/A |
| 14 | NORPAR 15 (EXXON) | 35 | ISOPAR L (EXXON) | 60 | | N/A | 2,2'-azobis(N-butyl-2-methylpropionamide (Wako) | 1 |
| 15 | n-hexadecane (Aldrich) | 40 | SHELLSOL T (Shell) | 53 | Tert-butyl hydroperoxide (LUPEROX TBH90) | 7 | 2,2'-azobis(N-butyl-2-methylpropionamide (Wako) | 0.5 |
| 16 | NORPAR 15 (EXXON) | 55 | ISOPAR V (EXXON) | 35 | Tert-butyl hydroperoxide (LUPEROX TBH90) | 10 | 2,2'-azobis(N-butyl-2-methylpropionamide (Wako) | 0.1 |

TABLE 3

| | Vehicle | | | | | | | | | |
|---|---|---|---|---|---|---|---|---|---|---|
| | Linear Alkane | | Branched Alkane | | Alcohol | | Metal Salt | | Colorant | |
| Example | Type | Wt % | Type | Wt % | Type | Wt % | Type | Wt % | Type | Wt % |
| 18 | n-hexadecane (Aldrich) | 20 | ISOPAR V (EXXON) | 47 | Oleyl Alcohol (Sigma Aldrich) | 20 | ADDITOL VXW 6206 (Solutia Inc.) | 3 | Example 17 | 10 |
| 19 | NORPAR 15 (EXXON) | 27.5 | ISOPAR V (EXXON) | 39.5 | Oleyl Alcohol (Sigma Aldrich) | 20 | ADDITOL VXW 6206 (Solutia Inc.) | 3 | Example 17 | 12 |
| 20 | NORPAR 15 (EXXON) | 7 | ISOPAR L (EXXON) | 56 | Oleyl Alcohol (Sigma Aldrich) | 25 | Cobalt salt of linolic acid (Example 5) | 2 | Example 17 | 5 |
| 21 | n-hexadecane (Aldrich) | 12 | SHELLSOL T (Shell) | 52 | Oleyl Alcohol (Sigma Aldrich) | 24 | Cobalt salt of linolic acid (Example 5) | 2 | Example 17 | 7 |

It will be appreciated that various of the above-discussed and other feature and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An ink-jettable overcoat composition for providing high-gloss, high-quality, and durable images, comprising:
   one or more organic liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; and
   one or more film-forming materials,
   wherein one or more of the one or more film-forming materials are unsaturated organic compounds chosen from unsaturated fatty materials having one or more terminal polar functional groups.

2. The overcoat composition according to claim 1, wherein the terminal polar functional groups are one or more functional groups chosen from the group consisting of alcohol functional groups, amine functional groups, acid functional groups, acid salts and combinations thereof.

3. The overcoat composition according to claim 1, wherein the one or more unsaturated fatty materials are chosen from unsaturated fatty alcohols, unsaturated fatty amines, unsaturated fatty acids, salts of unsaturated fatty acids and mixtures and combinations thereof.

4. The overcoat composition according to claim 1, further comprising one or more metal salts.

5. The overcoat composition according to claim 4, wherein the metal salts include one or more metals chosen from the group consisting of cobalt, manganese, lead, zirconium, calcium, barium, strontium, zinc, and mixtures thereof.

6. The overcoat composition according to claim 1, further comprising hydrophobic nanosilica particles.

7. An ink set for ink-jet recording comprising one or more overcoat compositions and one or more oil-based ink compositions, wherein
   one or more of the oil-based ink compositions comprise one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and/or $C_6$-$C_{30}$ branched alkenes, and mixtures thereof; one or more unsaturated organic compounds; and one or more colorants;

the one or more unsaturated organic compounds are one or more chosen from unsaturated fatty materials and unsaturated fatty materials having one or more terminal polar groups;

one or more of the overcoat compositions comprise one or more film-forming materials and one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; and one or more of the one or more film-forming materials are one or more unsaturated organic compounds chosen from unsaturated fatty materials having one or more terminal polar functional groups.

8. The ink set according to claim 7, wherein the terminal polar functional groups are one or more functional groups chosen from the group consisting of alcohol functional groups, amine functional groups, acid functional groups, acid salts and combinations thereof.

9. The ink set according to claim 7, wherein one or more of the overcoat compositions further comprise one or more metal salts.

10. The ink set according to claim 7, wherein one or more of the oil-based ink compositions further comprise one or more metal salts.

11. The ink set according to claim 7, wherein the ink set comprises one or more overcoat compositions, one or more ink compositions including one or more magenta colorants, one or more ink compositions including one or more cyan colorants, one or more ink compositions including one or more yellow colorants and one or more ink compositions including one or more black colorants.

12. The ink set according to claim 7, further comprising one or more pre-treatment compositions that comprise one or more organic liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; and one or more cross-linking initiators chosen from the group consisting of peroxy compounds and azo compounds.

13. A process for ink-jet recording comprising
depositing one or more oil-based ink compositions on a substrate; and depositing one or more overcoat compositions on the substrate wherein one or more of the oil-based ink compositions comprises one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; one or more unsaturated organic compounds; and one or more colorants;

the one or more unsaturated organic compounds are one or more chosen from unsaturated fatty materials and unsaturated fatty materials having one or more terminal polar groups;

one or more of the overcoat compositions comprise one or more film-forming materials and one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; and wherein one or more of the film-forming materials are one or more unsaturated organic compounds chosen from unsaturated fatty materials having one or more terminal polar functional groups.

14. The process according to claim 13, wherein the terminal polar functional groups are one or more functional groups chosen from the group consisting of alcohol functional groups, amine functional groups, acid functional groups, acid salts and combinations thereof.

15. The process according to claim 13, wherein one or more of the overcoat compositions further comprise one or more metal salts.

16. The process according to claim 13, wherein one or more of the oil-based ink compositions further comprise one or more metal salts.

17. A process for ink-jet recording comprising
depositing one or more pre-treatment compositions from a first ink-jet onto a substrate;

subsequently depositing one or more oil-based ink compositions on a substrate, said depositing one or more oil-based ink compositions comprising one or more of:

independently depositing one or more oil-based ink compositions including one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; one or more unsaturated organic compounds; and one or more yellow colorants from a second ink jet onto the treated substrate, independently depositing one or more oil-based ink compositions including one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; one or more unsaturated organic compounds; and one or more cyan colorants from a third ink jet onto the treated substrate, independently depositing one or more oil-based ink compositions including one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; one or more unsaturated organic compounds; and one or more magenta colorants from a fourth ink jet onto the treated substrate, independently depositing one or more oil-based ink compositions including one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; one or more unsaturated organic compounds; and one or more black colorants from a fifth ink jet onto the treated substrate, and depositing one or more overcoat compositions from a sixth ink jet onto the printed substrate wherein the one or more unsaturated organic compounds are one or more chosen from unsaturated fatty materials and unsaturated fatty materials having one or more terminal polar groups;

one or more of the overcoat compositions comprise one or more film-forming materials and one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof;

wherein one or more of the one or more film-forming materials are unsaturated organic compounds chosen from unsaturated fatty materials having one or more terminal polar functional groups; and one or more of the pre-treatment compositions comprise one or more organic liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; and one or more cross-linking initiators chosen from the group consisting of peroxy compounds and azo compounds.

* * * * *